United States Patent [19]

Ohchi

[11] 3,963,220

[45] June 15, 1976

[54] KNEADING MACHINE

[76] Inventor: Shuzo Ohchi, 39-3, Wada 3-chome, Suginami, Tokyo, Japan

[22] Filed: June 23, 1975

[21] Appl. No.: 589,778

[30] Foreign Application Priority Data

July 5, 1974 Japan.............................. 49-76495
July 5, 1974 Japan.............................. 49-76496

[52] U.S. Cl.......................... 259/107; 259/DIG. 10; 259/DIG. 14
[51] Int. Cl.²................................. B02C 18/12
[58] Field of Search............ 259/107, 108, DIG. 10, 259/DIG. 14

[56] References Cited
UNITED STATES PATENTS

| | | | |
|---|---|---|---|
| 918,215 | 4/1909 | Steen | 259/107 |
| 2,159,856 | 5/1939 | MacLear | 259/107 |
| 2,296,581 | 9/1942 | Smith | 259/107 |
| 2,723,839 | 11/1955 | Lorenz | 259/DIG. 10 |
| 3,172,441 | 3/1965 | Hartwig | 259/107 |
| 3,355,152 | 11/1967 | Otto | 259/107 |
| 3,612,125 | 10/1971 | Krauth | 259/108 |

Primary Examiner—Richard E. Aegerter
Assistant Examiner—A. J. Mirabito
Attorney, Agent, or Firm—Wenderoth, Lind & Ponack

[57] ABSTRACT

A kneading machine includes a pot the diameter of which gradually increases toward the top from the bottom thereof, and a rotatable blade centrally located at the bottom of the pot. At specified positions on the inside wall of the pot there are provided a plurality of projections jutting toward the center of the pot. The rotatable blade is formed of a circular body with a specified radius and an integrated combination of a large blade and a small blade provided on the body at a circumferential angle of separation of about 180°–270°. The small blade is a rectangular plate which is inclined at a given angle to the central vertical axis of the body. The small blade has a bottom side located on the same horizontal plane as the bottom of the body and a top side which gradually rises toward the body and which is integrated to a specified outside position located lower in the vertical direction than the topmost plane of the body. The large blade has a wing-shaped top side which gradually rises outwardly from adjacent the topmost plane of the body. The inside surface of the large blade is substantially an extension of the outside surface of the small blade. The large blade top side is inclined downwardly at a specified angle from the inner or trailing end thereof to the outer or leading end thereof. When the rotatable blade is fitted to a rotating shaft centrally provided at the bottom center of the pot, the outer end faces of the small blade and the large blade are respectively held at a specified distance from the opposed inside wall of the pot.

5 Claims, 13 Drawing Figures

KNEADING MACHINE

BACKGROUND OF THE INVENTION

It is known that bread baking is difficult in the home. This is because the housewife finds it difficult to dissolve the bread materials such as flour, yeast, sugar and salt in water and blend them.

Commonly, the bread baking process is divided into five steps. In the first step, the main materials such as flour, yeast, sugar and salt are mixed in water and kneaded. In the second step the materials kneaded in the first step are fermented at 30°–35°C to swell. In the third step a swollen mass obtained in the second step is squeezed to eliminate the gas therein. In the fourth step the product of the third step is again fermented at 35°–40°C. In the fifth step, the mass which has gone through the second fermentation is baked at 180°–200°C.

Usually the first step takes place as follows. The main material, i.e. flour, is piled up on a rolling board. Specified amounts of sugar, yeast, salt and water are put into the middle of the pile and the surrounding flour is slowly collapsed to blend. Next, the materials thus blended are kneaded together. In kneading them, a strong force is necessary on account of gluten, i.e. a highly viscous substance being present in the flour. The kneading process is a repetition of the following cycle, i.e. blending, folding and tearing of the material, and then hurling the torn mass against the rolling board. In such a process, the mass, initially sticky, becomes increasingly plastic after approximately fifteen minutes of repeated kneading and turns into a glossy material such as the Japanese "mochi," as a result of the gluten in the flour making the mass viscous during the kneading process. Kneading is absolutely necessary for the formation of good bread. It is commonly admitted that the longer the kneading time, e.g. thirty minutes or one hour, the better the bread. At a massproduction baker, various devices electrically or mechanically perform the kneading process rather than by the use of manpower.

In all such cases however, large-scale equipment, and therefore a great amount of power, is needed for this purpose. Thus, it would be practically impossible for the housewife to be provided with such equipment for home baking.

Meanwhile, the demand remains, and in fact is steadily mounting, for the housewife to serve home-baked hot and fresh from the oven to the family at meals. As explained above however, it is difficult to provide home-baked bread, because there is no simple device available that enables the easy achievement in the home of the process of dissolving in water, and kneading the flour, yeast, sugar and salt, and because performing such process manually, at least on a regular basis, is too strenuous for the housewife.

SUMMARY OF THE INVENTION

In view of the above, a first object of the present invention is to provide a simplified kneading machine that can be drven by small amounts of power, thereby facilitating home-baking by the housewife. A second object of the present invention is to provide a kneading machine of this type which is characterized by a particularly high kneading efficiency, in spite of the small amounts of power applied, thereby making it possible to simplify the general proces of blending and kneading powdered materials.

These objects are achieved by the provision of a kneading machine according to the present invention which includes an open-top pot which has a diameter gradually increasing upwardly from the bottom thereof, and a rotatable blade fitted centrally at the bottom of the pot. A plurality of projections are formed on the inside wall of the pot, the projections being inclined by a specified angle to the central vertical axis of the pot. The rotatable blade is formed of a blade body and an integrated combination of a small blade and a large blade fixed to the body of a circumferential angle of separation of 180°–270° from each other. The small blade is a rectangular plate installed at an outward inclination to the central vertical axis of the body. The bottom side of the small blade is on the same horizontal plane as the bottom side of the body, and the top side of the small blade is integrally fixed to the body at a specific position located lower in the vertical direction than the topmost plane of the body, i.e. the center of the top side of the body.

The large blade has a top side which is wing-shaped and which rises gradually outwardly from adjacent the topmost plane of the body. The inside and trailing surface of the large blade lies substantially on an extension of the outside surface of the small blade. The wing-shaped top of the large blade is inclined downwardly at a mild angle from the inner or trailing end thereof toward the outer or leading end thereof. The projections provided on the inside wall of the pot are desirably inclined at an angle 20°–45° to the central vertical axis of the pot. The outward inclination angle of the wing-shaped top of the large blade is desirably 55°–75°. The inclination angle of the small blade to the axis of the rotatable blade body is desirably 25° to 55°. The inclination angle of the inner top of the large blade to the bottom of the rotatable blade body is 15° ~ 40°. Preferrably, there are three projections provided on the inside wall of the pot equally spaced around the circumference thereof.

Other objects as well as characteristic features of the present invention will become more apparent and more readily understandable by the following description and appended claims when read in conjunction with the accompanying drawings, wherein:

DETAILED DESCRIPTION OF THE INVENTION

Referring to FIGS. 1 through 13, a kneading machine according to the present invention will be described in detail.

Figure 1:
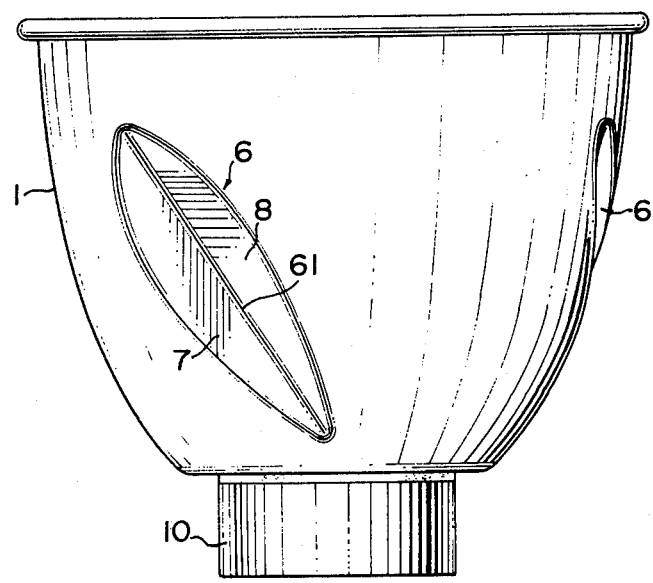
FIG. 1 is a front view of an embodiment of the present invention.
Figure 2:
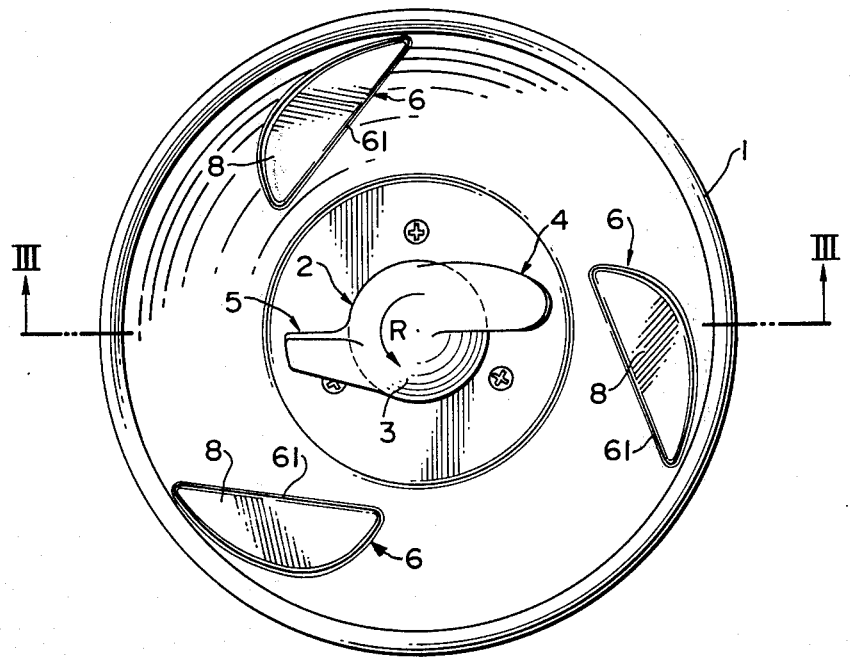
FIG. 2 is a plan view corresponding to FIG. 1.
Figure 3:
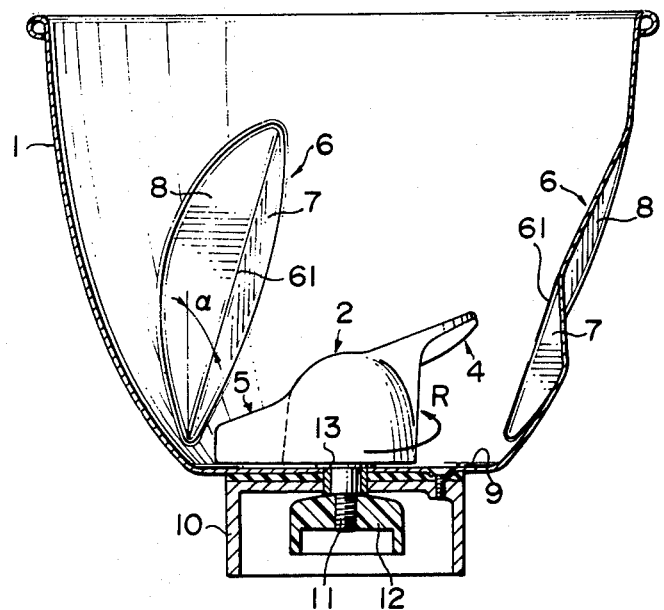
FIG. 3 is a sectional view along line III—III of FIG. 2.
Figure 4:
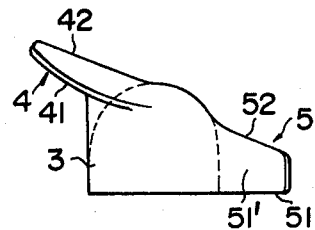
FIGS. 4 to 7 illustrate the structural details of one embodiment of the rotatable blade which is a component of the present invention, FIG. 4 being a front view, FIG. 5 being a corresponding plan view, FIG. 6 being a corresponding left side view, and FIG. 7 being a corresponding right side view.
Figure 8:
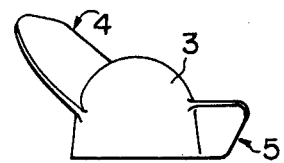
FIGS. 8 to 11 illustrate the structural details of a second embodiment of the rotatable blade, FIG. 8 being a front view, FIG. 9 being a corresponding plan view, FIG. 10 being a corresponding left side view, and FIG. 11 being a corresponding right side view.
Figure 5:
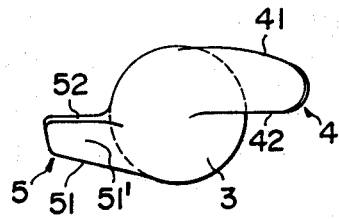
Figure 9:
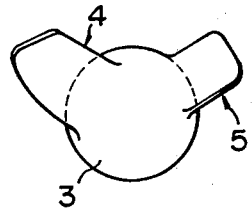
Figure 6:
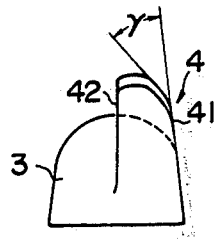
Figure 10:
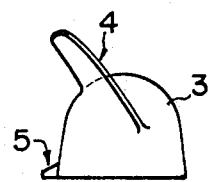
Figure 7:
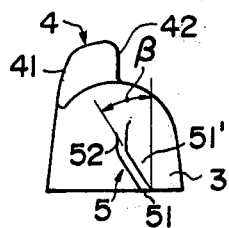
Figure 11:
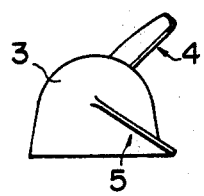

In FIGS. 1 through 3, there is shown the pot 1, the diameter of which gradually increases upwardly from the bottom 9, and the top of which is open. At specified positions on the inside wall of pot 1 are formed projections 6, which can be formed by applying a force, e.g. from the right as shown in FIG. 3, to the corresponding parts of the pot such that the wall of the pot is dented inwardly toward the center of the pot. The innermost or highest part of the projection is shown at 61, which is joined at one hand to the corresponding inside pot wall by the sloped portion 8 and on the other hand to the corresponding inside pot wall by the sloped portion 7. The line of projection portion 61 is formed at a specified inclination angle $\alpha$, e.g. 20°–45°, to the central vertical axis of the pot 1. When, as illustrated in FIG. 3, the rotatable blade 2 to be described later is installed to rotate in the direction R, it is desirable to make the slope of portion 7 in the rotating direction as steep as possible. According to tests, the desirable angle of the sloped portion 7 to the peripheral velocity of rotatable blade 2 at the inclined position of the sloped portion 7 is 50°–70°.

The inclination of the projection line 61, and the angle formed by the peripheral velocity of rotatable blade 2 at the inclined position of the sloped portion 7 and the sloped portion 7 are respectively set at 20°–45° and 50°–70° for the purpose of pushing downwardly along the sloped portion 7 the bread materials which are hurled against the inside wall of the pot along the wing-shaped surface of the large blade 4 upon rotation of the rotatable blade 2 during the kneading process.

If the angle of the projection line 61 is made smaller than the above values, then the force acting to push down the bread materials will drop. On the contrary, if such angle is made larger than the above values, then the sloped portion 7 will not be able to hold the bread materials on the total area thereof, and the force pushing down the bread materials will also drop, thus resulting in a decreased kneading force.

More than one projection 6 may be provided on the inside wall of the pot. Experiments have shown that when three such projections are installed at equal spacings on the inside wall of the pot 1, a desirable kneading force can be developed.

The pot 1 is desirably made of a metal such as aluminum or of a synthetic resin material. On the inside surface and bottom surface of the pot may be formed a layer of anti-adhesion material, e.g. by the alumilite method, such that during the kneading process a part of the solid mass of bread materials will be prevented from adhering to the wall and bottom of the pot.

At the bottom center of the pot 1 is located the rotatable blade 2.

Structural details of the rotatable blade 2 will be described with reference to FIGS. 4 through 11.

The rotatable blade 2 is formed of a blade body 3, a large blade 4 and a small blade 5 which are integrally fitted to body 3 at a circumferential angle of separation of 180°–270°. The blade body 3 is a circular body having a rounded head. The small blade 5 is a rectangular plate which extends outwardly from body 3 and which is inclined downwardly and forwardly, with respect to the direction of rotation, to the central vertical axis of body 3 at an angle $\beta$ of 25°–55°. The bottom 51 of the small blade 5 is on the same horizontal plane as the bottom of body 3. The top 52 of small blade 5 is integral with body 3 at a specified position which is lower in the vertical direction than the topmost plane of body 3, i.e. the top center of the body. The angle of inclination of top 52 from the outer end of the small blade 5 toward body 3 is substantially the same as the angle of inclination of the inner or trailing, in the direction of rotation, top surface 42 of the large blade 4 to be described later, desirably 20°. The inclination of small blade 5 to the central vertical axis of the body 3 is selected as 25°–55° for the following reason. Specifically, in the initial stage of kneading process, with rotation of the rotatable body 2, the greater part of bread materials in particle form are lifted up along the outside or leading surface 51' of the small blade 5 and hurled rearwardly of small blade 5. By repetition of this cycle, the bread material is turned from particles into balls and then into a solid mass. After the bread materials are formed into a solid mass, with rotation of the rotatable blade, the solid mass has a force imparted thereto such that one part of the mass is hurled out against the top side of the large blade, while the remainder of the mass is hurled out in a direction below the large blade, thereby producing a desirable kneading effect. Experimental results indicate that it would be difficult to achieve repetition of such a cycle if the angle between the small blade 5 and the central vertical axis of the body 3 were set larger or smaller than the above specified values.

The large blade has a wing-shaped top surface, and it rises gradually outwardly from around a position adjacent or slightly lower than the topmost plane of the body 3. The inner or trailing surface 42 of the large blade 4 is located substantially on an extension of the upper or trailing surface 52 of the small blade 5, while the wing-shaped top is inclined forwardly and downwardly from trailing surface 42 to leading edge 41 with a mild slope $\gamma$ of 55°–75°. Selection of such angle $\gamma$ as 55°–75° is made for the reason that at this angle a part of the solid mass which has been pushed up along the surface 51' of the small blade 5 with rotation of the rotatable blade 2 can best be hurled out in the direction of the sloped portion 7 of the pot 1. A smaller or larger value of the angle of inclination of the wing-shaped top surface of the large blade than the above specified value would make it impossible to hurl out the solid mass in a desirable manner toward the sloped portion 7 of the pot 1.

In FIGS. 4 through 7, an example of the small blade 5 and the large blade 4, separated at a circumferential angle of 180° and connected to the blade body 3, is illustrated. In FIGS. 8 through 11 an example of the small blade 5 and the large blade 4 being arranged at a circumferential angle of 270° is illustrated. According to experiments, the above-mentioned common bread materials can be blended and kneaded into a good dough, without becoming pasty due to heat generation in the bread materials, when the small blade 5 and the large blade 4 are circumferentially separated by 180° as illustrated in FIGS. 4 through 7, and moreover a sharper angle $\beta$ mentioned above, e.g. 25° $\sim$ 40°, is chosen for small blade, while a duller inclination angle $\gamma$, e.g. 55° $\sim$ 70°, is chosen for the large blade.

In the case of materials such as those for "Mochi" (Japanese cake) which attain a higher viscosity than bread materials during kneading, a better kneading effect will be obtained when the small blade and the large blade are circumferentially separated by 270°, and when a duller angle β, e.g. 45° ~ 55°, is chosen for the small blade 5, while a sharper inclination angle γ, e.g. 65° ~ 75°, is chosen for the large blade 4.

The reason for the above selection is believed to be as follows. In the kneading process described later, when a material having a high viscosity is hurled from the surface 51' of the small blade in the direction of the top side of the large blade, due to the high viscosity and with the arrangement of FIGS. 4 through 7, all the materials will be hurled against the top side of the large blade, and a full kneading effect will not be gained. If however, the arrangement is such as shown in FIGS. 8 through 11, the slope of the small blade is less steep than that illustrated in FIGS. 4 through 7, and the separation between the small blade and large blade is 90° larger, then part of the kneaded material will be hurled in a direction below the large blade, while the rest of the material will be hurled in a direction of the top side of the large blade, thus resulting in a good kneading effect. Thus it would be desirable that for kneading of bread materials, the arrangement of FIGS. 4 through 7 be employed, and as the material to be kneaded increases in viscosity, the angle of separation between the small blade and the large blade gradually be made larger than 180°, and correspondingly the inclination angle β of the small blade be made less sharp, while the top slope γ of the large blade be made steeper. It should be noted however that the upper limit of positional separation between the large blade and small blade is 270°, the upper limit of the inclination β of the small blade is 55°, and the upper limit of the top side inclination γ of the large blade is 75°.

The pot 1 is fitted to a casing 10. A rotatable shaft 11 extends through a hole 13 bored centrally in the pot 1 and the casing 10. At one end of rotatable shaft 11 is connected the rotatable blade 2, and at the other end is fitted a coupling 12 which is connected to a drive motor (not shown).

The pot 1 is charged by a known method with the major materials of bread, i.e. flour, yeast, sugar, and water, in known proportions. When thereafter the drive motor is started, the coupling 12 via the rotatable shaft 11 causes the rotatable blade 2 to rotate at a specified speed, e.g. 270–330 rpm, in the direction of arrow R of FIG. 3. If the rotating speed of the rotatable blade 2 is maintained in the specified range, with rotation of the rotatable blade 2 the bread materials and water will rise along the surface 51' in the rotating direction of the small blade 5 and most of them will be hurled over the top side 52 of the small blade 5. Through repetition of this cycle, most of the particles of the bread materials will, in view of the fact that the small blade 5 is installed along the bottom of the pot 1 and is practically in contact with the pot bottom 9, be circulated. A specified time after the drive motor is started, a specified amount of flour, salt and table oil are additionally charged into the pot 1 with the blade 2 still being driven. When a specified time has passed after the additional charge of materials into the pot 1, particles of the charged materials turn from particles into balls and finally into a solid mass. The size of such mass usually depends on the size of the rotatable blade 2.

This process is followed by a process wherein the solid mass is kneaded mainly by the small blade 5, the large blade 4 and the projections 6 provided on the wall of the pot 1.

With rotation of the rotatable blade 2, the lower part of the solid mass is pushed upwardly along the surface 51' of the small blade 5 depending on the inclination angle thereof. Then a part of such solid mass is pushed down by the wing-shaped top surface of the large blade 4, depending on the angle of inclination thereof, and hurled against the wall of the pot 1.

Since the angles of the wing-shaped top of the large blade 4 and of projections 6 are set as mentioned above, the solid mass thus hurled out hits the slopes of projections 6 provided on the wall of the pot 1 and is pushed down by sloped portions 7.

On the other hand, the remainder of the solid mass is hurled below the large blade 4. This lower part of the solid mass is pushed up by the inclined surface 51 of the small blade 5 and accordingly the solid mass under its own weight receives an overturning force. When the mass is overturned, the solid mass moves to the bottom center of the pot 1, the diameter of which gradually diminishes toward its bottom. Thereafter, the above process of kneading is repeated by the rotatable blade and the projections.

Figure 12:
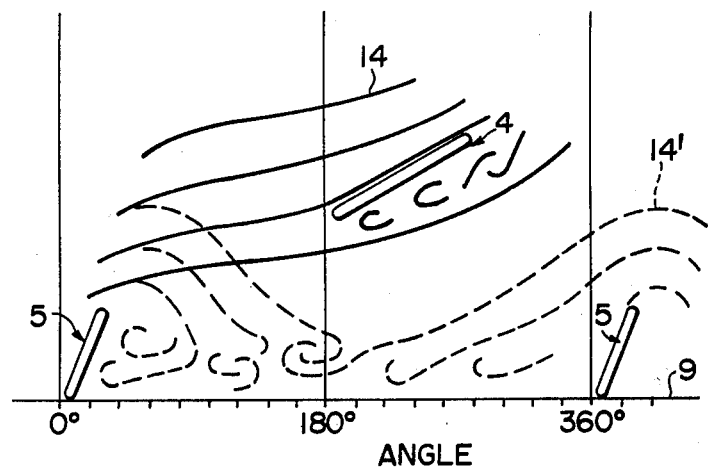
FIG. 12 is an evolved graph illustrating the function of the rotatable blade of the present invention.
Figure 13:
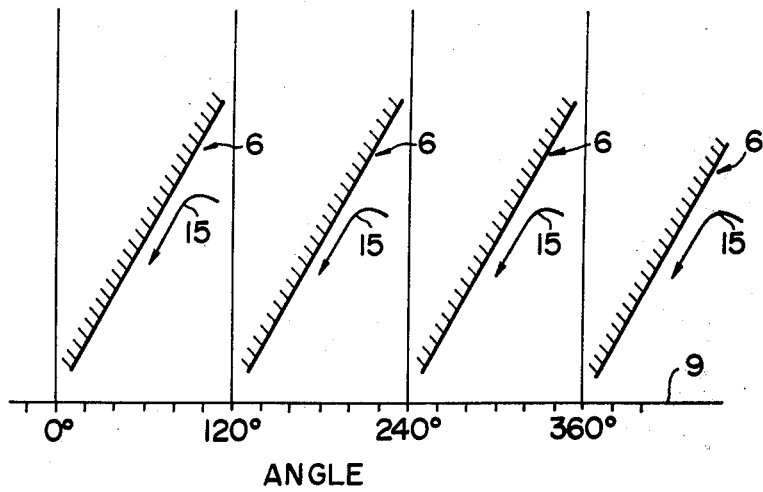
FIG. 13 is an evolved graph illustrating the function of a projection on the inside wall of the pot of the present invention.

FIGS. 12 through 13 are graphs respectively illustrating the action of the rotatable blade 2 and the projection 6 provided on the wall of the pot.

FIG. 12 illustrates the movement of the bread materials under the action of the rotatable blade 2 making one rotation within the pot, whereby for expediency of explanation only the relative movement between the rotatable blade 2 and the bread materials is represented, wherein the bread materials are shown when the rotatable blade is momentarily at rest.

In the initial stage of the kneading process according to the present invention as described above, most of the particles of bread materials make, as indicated by the dotted line 14', an upward movement along the sloped surface 51 of the small blade 5 and are hurled outwardly and behind the small blade 5. This action is repeated by every rotation of the rotatable blade 2, and this successive stirring takes place at the pot bottom near the small blade 5, and thereby the particles are turned from balls into a solid mass. In this case, if the rotating speed of the rotatable blade is kept in the range of 270 ~ 330 rpm, at least until the materials are maintained in the fine ball form, the greater portion of the materials will not climb up wing-shaped top surface of the large blade 4. After the bread materials turn into a solid mass, a part of such solid mass, as indicated by the solid line 14, will climb up the sloped surface 51' of the small blade 5, and while the rotatable blade makes a half rotation such part will receive a force which pushes it onto the wing-shaped top of the large blade 4, while the remainder of the solid mass is hurled below the large blade 4. On the bread materials pushed onto the wing-shaped top acts a force which hurls such materials toward the inward direction of the pot 1 along the slope of the wing-shaped top.

FIG. 13 is a graph illustrating the flow of the bread materials, in which the relative movement between the projections 6 on the wall of the pot and the bread materials only is pictured, and whereby the projections 6 are momentarily at rest. The bread materials hurled in the inward direction of the pot while being lifted through the action of the small blade 5 and the large blade 4 contact the sloped portion 7 of the projection 6 and, as indicated by the solid line 15, are moved down by the effect of the projections 6 and the weight of the bread materials, and because of the inclination angles of the wing-shaped top of the large blade 4 and the projections 6 are set as above. The bread materials which are thus forced downwardly move, as described above, toward the center of the pot and again are contacted by the rotatable blade 2, whereby they are successively cyclically kneaded.

The following experiments have been conducted to confirm the effect of the present invention.

EXAMPLE 1

1. Experimental Conditions
  1. Pot
  Shape: as indicated in FIGS. 1–3
  Dimensions:
  Bottom diameter: 100 mm
  Top diameter: 200 mm
  Height of projection line 61: 16 mm
  Inclination angle of projection line 61 to the central vertical axis of pot: 30°
  Inclination angle of slope portion 7: 60°
  Number of projections: three projections equally circumferentially spaced around the pot wall.
  2. Rotatable Blade
  Shape: same as illustrated in FIGS. 3 – 7
  Dimensions:
  Body diameter: 45 mm
  Body height: 35 mm
  Body top radius: 25 mm
  Outer end height of small blade 5: 10 mm
  Inclination angle of small blade 5 to body axis: 25° ~ 40°
  Length and central part width of wing-shaped top of large blade 4: 45 × 23 mm
  Inclination angle of wing-shaped top of large blade 4 from the body toward the outside: 15°–27°
  Inclination angle of wing-shaped top of large blade 4: 55° ~ 70°
  3. Bread materials charged and their mixing proportions (by weight):
  Material as shown in (a) below were charged in the pot and the rotatable blade was rotated. When 30 to 45 minutes passed after starting of rotation of rotatable blade, materials shown in (b) below were additionally charged.
    a. Flour : 60 Yeast : 1.5 Sugar : 5 Water : 60.
    b. Flour : 40 Salt : 1.5 – 2.0 Table oil : 3 (parts by weight).
  4. Rotating speed of rotatable blade : 300 rpm
  5. Large blade and small blade circumferentially separated by 180° ~ 220°

2. Results
The materials shown in 3) (a) were charged into the pot, and thereafter rotation of the rotatable blade was started. In this state the materials were blended for 30 to 45 minutes. Thereafter the materials shown in 3) (b) were additionally charged. When four – five minutes had passed, the materials turned into a solid mass. After five - six mintues, the kneading of the solid mass in the pot was completed, and the rotatable blade was stopped. In this way, a glossy dense dough was obtained. Bread baked of this dough tasted better than conventional bread. It should be noted that the power consumption needed for the above blending and kneading process was as little as 100 W.

EXAMPLE 2

1. Experimental Conditions
  1. Pot
  Same as in the experimental example 1
  2. Rotatable blade
  Shape: same as illustrated in FIGS. 8–11
  Dimensions:
  Body diameter: 45 mm
  Body height: 35 mm
  Body top radius: 25 mm
  Outer end height of small blade 5: 18 mm
  Inclination angle of small blade 5 to body axis: 45° ~ 55°
  Length and central part width of wing-shaped top of large blade 4: 35 × 26 mm
  Inclination angle of wing-shaped top of large blade 4 from body toward the outside: 30° ~ 40°
  Inclination angle of wing-shaped top of large blade 4: 65° ~ 75°
  Large blade and small blade circumferentially separated by 230° ~ 270°
  3. Materials to be blended and kneaded; rice washed, dried and steamed for 20 - 30 minutes 2. Results
The material was charged in the pot, and thereafer the rotatable blade was started. Two or three minutes thereafter the materials turned into solid mass. Approximately thirty minutes kneading of te solid mass was carried out and then the rotatable blade was stopped. A glossy dense "mochi" was obtained.

According to the present invention the following advantages are achieved:

1. Bread material can be simply and efficiently kneaded, and thus home baking which has been considered difficult is made easy.

2. Up to the formation of the solid mass the process relies mainly on the action of the small blade. Thereafter, the kneading of the solid mass thus formed is achieved by the cooperative action of the small blade, the large blade and the projections on the wall of the pot. Thus, the materials which have been well blended can be kneaded evenly to a high density.

3. Since the profiles and inclination angles of the small blade, the large blade and the projections are precisely coordinated, smooth blending and kneading can be assured. Not only can the material be well blended, but also the heat generated during kneading prevents the material from turning pasty, and a low drive torque of the rotatable blade ensures smooth kneading.

It goes without saying that the present invention is applicable not only to the bread materials but also to the kneading of solid particles in a liquid.

Various modifications may be made to the specific embodiments described above without departing from the scope of the invention.

What is claimed is:

1. A kneading machine comprising:
  a pot having an open top and a diameter gradually increasing upward from the bottom thereof;
  a rotatable blade centrally installed at the bottom of said pot;
  a plurality of projections provided on the inside wall of said pot and inclined to the central vertical axis of said pot;
  said rotatable blade comprising a blade body, a small blade and a large blade integrally fitted to said body at a circumferential angle of separation of 180° - 270°;

said small blade comprising a rectangular plate fitted to said body and extending outwardly therefrom and forwardly downwardly inclined relative to said central vertical axis of said body, the bottom of the small blade being on the same horizontal plane as the bottom of said body, said small blade having a top side integrally fitted to said body at a position thereof lower in the vertical direction than the top center of the body;

said large blade having a wing-shaped top surface rising outwardly from a position adjacent the topmost plane of the body, said large blade having a trailing surface on substantially an extension of said top side of said small blade; and said wing-shaped top surface of said large blade being inclined downwardly from the trailing edge thereof to the leading edge thereof.

2. A kneading machine as claimed in claim 1, wherein said projections on said pot wall are inclined at an angle of from 20°–45° to said central axis of the pot; said wing-shaped top surface of said large blade is inclined at an angle of from 55°–75°; said small blade is inclined to said blade body axis at an angle of from 25°–55°; and the angle of inclination of said top side of said small blade and the angle of inclination of said top surface of said large blade are each from 15°–40°.

3. A kneading machine as claimed in claim 1, wherein said plurality of projections comprise three projections equally circumferentially spaced around the inside wall of said pot.

4. A kneading machine as claimed in claim 1, wherein said pot is fabricated of aluminum or a synthetic resin material.

5. A kneading machine as claimed in claim 1, further comprising means for rotating said rotatable blade at a speed of 270–330 rpm.

* * * * *